United States Patent
Garratt et al.

(10) Patent No.: US 10,318,621 B2
(45) Date of Patent: *Jun. 11, 2019

(54) COLLATING AND INTELLIGENTLY SEQUENCING INSTALLATION DOCUMENTATION

(71) Applicant: International Business Machines Corporation, Armonk, NY (US)

(72) Inventors: Andrew M. Garratt, Andover (GB); Andrew D. Humphreys, Emsworth (GB); Martin G. Keen, Cary, NC (US); John J. P. McNamara, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 506 days.

This patent is subject to a terminal disclaimer.

(21) Appl. No.: 15/045,638

(22) Filed: Feb. 17, 2016

(65) Prior Publication Data
US 2016/0314107 A1 Oct. 27, 2016

Related U.S. Application Data

(63) Continuation of application No. 14/693,564, filed on Apr. 22, 2015, now Pat. No. 9,361,086.

(51) Int. Cl.
*G06F 8/61* (2018.01)
*G06F 8/73* (2018.01)
(Continued)

(52) U.S. Cl.
CPC .............. *G06F 17/241* (2013.01); *G06F 8/61* (2013.01); *G06F 8/73* (2013.01); *G06F 16/285* (2019.01); *G06F 16/93* (2019.01)

(58) Field of Classification Search
CPC ................ G06F 8/60–8/66; G06F 8/73; G06F 17/20–17/21; G06F 17/218;
(Continued)

(56) References Cited

U.S. PATENT DOCUMENTS 6,513,045 B1 1/2003 Casey et al.
6,910,182 B2 6/2005 Huang
(Continued)

OTHER PUBLICATIONS

Damljanovic et al., "D6.3 Integrated Testbed of Case Study 1", EU-IST Strategic Targeted Research Project (STREP) IST-2004-026460 TAO, TAO/2008/D6.3/v1.0, Contractual Date: Aug. 30, 2008, Copyright © 2008, University of Sheffield, 26 pages.
(Continued)

*Primary Examiner* — Todd Aguilera
(74) *Attorney, Agent, or Firm* — William H. Hartwell; David K. Mattheis

(57) ABSTRACT

A computer-implemented method for collating and intelligent sequencing of installation documentation includes parsing one or more product installation documents to identify annotations associated with installation procedures. Installation procedure descriptions, parameters, and prerequisites associated with the identified annotations are extracted, and prescriptive step-by-step installation instructions that integrate installation procedures contained within the one or more installation documents are generated.

14 Claims, 6 Drawing Sheets

(51) Int. Cl.
   *G06F 16/28* (2019.01)
   *G06F 16/93* (2019.01)
   *G06F 17/24* (2006.01)
(58) Field of Classification Search
   CPC .. G06F 17/241; G06F 17/2705–17/272; G06F 17/28; G06F 17/30011; G06F 17/30598; G06F 16/93; G06F 16/285
   USPC .................. 717/123, 168–178; 715/230–233
   See application file for complete search history.

(56) References Cited

U.S. PATENT DOCUMENTS

| | | | |
|---|---|---|---|
| 6,968,551 | B2 | 11/2005 | Hediger et al. |
| 7,228,542 | B2 | 6/2007 | Bryant et al. |
| 7,415,714 | B2 | 8/2008 | Chapman |
| 7,844,903 | B2 | 11/2010 | Dawkins et al. |
| 8,307,341 | B2 | 11/2012 | Eykholt |
| 8,312,368 | B2 | 11/2012 | Swamidass |
| 8,631,396 | B2 | 1/2014 | Kurimilla et al. |
| 8,739,155 | B2 | 5/2014 | Hehir et al. |
| 9,361,086 | B1 | 6/2016 | Garratt et al. |
| 2003/0126128 | A1* | 7/2003 | Watson ................ G06F 17/218 |
| 2004/0123284 | A1 | 6/2004 | Bryant et al. |
| 2004/0199901 | A1 | 10/2004 | Chapman |
| 2005/0251786 | A1 | 11/2005 | Citron et al. |
| 2007/0028229 | A1 | 2/2007 | Knatcher |
| 2008/0077451 | A1* | 3/2008 | Anthony ................ G06Q 10/10 705/4 |
| 2008/0228671 | A1 | 9/2008 | Nagaraj |
| 2011/0302570 | A1 | 12/2011 | Kurimilla et al. |
| 2015/0088589 | A1 | 3/2015 | Marin et al. |
| 2015/0363185 | A1 | 12/2015 | Garratt et al. |

OTHER PUBLICATIONS

IBM, "Method of installing products spanning multiple machines and components using a single user interface", An IP.com Prior Art Database Technical Disclosure, Original Publication Date: Nov. 28, 2005, IP.com No. IPCOM000131999D, IP.com Electronic Publication: Nov. 28, 2005, pp. 1-3.

Murakami et al., "A Proposal of an Installation Manual Generation Method for Open Source Software Using Operation Logs", 2008 IEEE International Conference on Signal Image Technology and Internet Based Systems, © 2008 IEEE, pp. 547-554.

Murakami et al., "A Web-based Installation Manual Management System for Open Source Software",2009 Fifth International Joint Conference on INC, IMS, and IDC, © 2009, IEEE, pp. 1261-.1266.

U.S. Appl. No. 14/693,564, Entitled "Collating and Intelligently Sequencing Installation Documentation", filed Apr. 22, 2015.

Appendix P.: List of IBM Patents or Patent Applications Treated as Related, Dated Feb. 17, 2016, 2 pages.

* cited by examiner

COLLATING AND INTELLIGENTLY SEQUENCING INSTALLATION DOCUMENTATION

BACKGROUND

The present invention relates generally to the field of installation documentation, and more particularly to collating and intelligent sequencing of installation documentation. When installing a solution comprised of multiple products, installed and integrated together, there is typically no single documentation source describing the steps to perform a full installation of the solution. Each product provides its own set of installation steps with variations for version, operating system, product features, and other considerations. When multiple products are installed with the intent of integrating them together, there are dependencies between the products that affect the order and steps involved in the installation.

SUMMARY

Embodiments in accordance with the present invention disclose a method, computer program product, and system for collating and intelligent sequencing of installation documentation. In an embodiment, the method includes parsing one or more product installation documents to identify annotations associated with installation procedures. Installation procedure descriptions, parameters, and prerequisites associated with the identified annotations are extracted, and prescriptive step-by-step installation instructions that integrate installation procedures contained within the one or more installation documents are generated.

DETAILED DESCRIPTION

Embodiments in accordance with the present invention recognize that the process of installing a solution made up of multiple products installed and integrated together may be facilitated by a method for generating a single set of installation instructions for the solution, derived from each individual product's installation instructions. A system capable of implementing this method takes prescriptive step-by-step installation instructions from multiple products and combines them into prescriptive step-by-step installation instructions for the solution. This set of master installation instructions for the solution is structured to take into consideration common tasks and prerequisites. All products in a solution might require the creation of a common set of resources such as database tables, message queues, and resource adapters. These tasks are grouped so the master installation instructions perform each of these tasks together—all database tables are created, then all message queues, and so forth. The master installation instructions also consider whether one task must be performed before another, and sequence the installation instructions accordingly.

Figure 1:
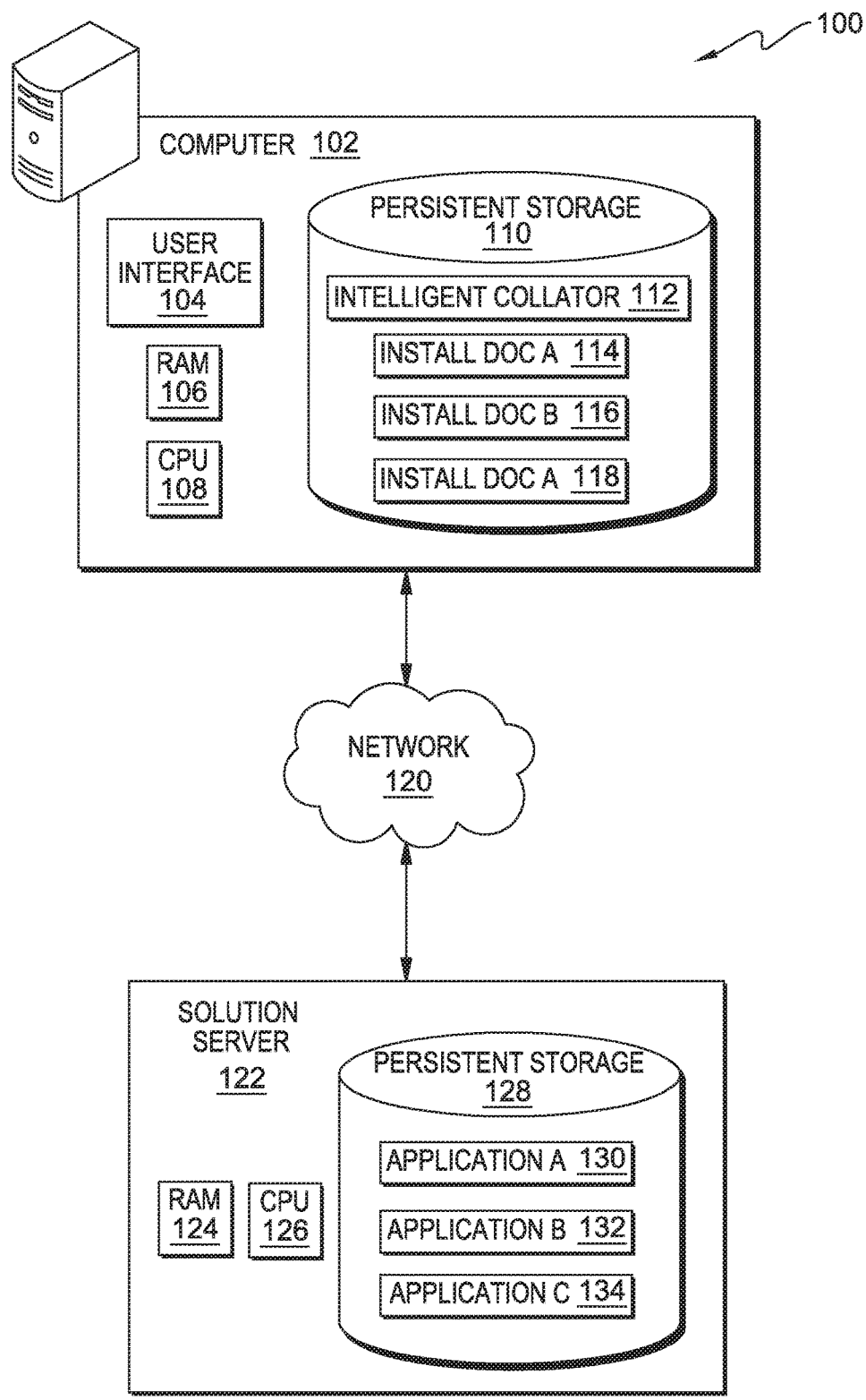
FIG. 1 is a functional block diagram illustrating a data processing environment, in an embodiment in accordance with the present invention.

Embodiments in accordance with the present invention will now be described in detail with reference to the figures. FIG. 1 is a functional block diagram, generally designated 100, illustrating a data processing environment, in an embodiment in accordance with the present invention.

Intelligent collating environment 100 includes computer 102, network 120, and solution server 122, all interconnected over network 120. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 120. In other embodiments, computer 102 may represent server computing systems utilizing multiple computers as a server system, such as in a distributed computing environment. In general, computer 102 is representative of any electronic devices or combinations of electronic devices capable of executing machine-readable program instructions.

Computer 102 includes user interface 104, random access memory (RAM) 106, a central processing unit 108, and persistent storage 110. User interface 104 provides an interface between a user of computer 102 and solution server 122 over a data connection on network 120. User interface 104 may be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. User interface 104 may also be mobile application software that provides an interface between a user of computer 102 and solution server 122 over a data connection on network 120. Mobile application software, or an "app," is a computer program designed to run on smart phones, tablet computers and other mobile devices. User interface 104 enables a user of computer 102 to combine multiple installation documents into a single prescriptive step-by-step installation document for products to be installed on solution server 122.

Computer 102 includes persistent storage 110. Persistent storage 110 may, for example, be a hard disk drive. Alternatively, or in addition to a magnetic hard disk drive, persistent storage 110 may include a solid state hard drive, a semiconductor storage device, read-only memory (ROM), erasable programmable read-only memory (EPROM), flash memory, or any other computer-readable storage medium that is capable of storing program instructions or digital information. Intelligent collator 112, install document "A" 114, install document "B" 116, and install document "C" 118 are stored in persistent storage 110, which also includes operating system software, as well as software that enables computer 102 to communicate with solution server 122 over a data connection on network 120. Intelligent collator 112 is an application that generates a single set of installation instructions for a solution, derived from multiple product installation instructions, and can send and receive data over a network, e.g., network 120, or any other viable data network. There can be many more computers and solution server computers in this environment than are depicted in FIG. 1.

In FIG. 1, network 120 is shown as the interconnecting fabric between computer 102 and solution server 122. In practice, the connection may be any viable data transport network, such as, for example, a local area network (LAN) or wide area network (WAN). Network 120 can be, for example, a LAN, a WAN such as the Internet, or a combination of the two, and include wired, wireless, or fiber optic connections. In general, network 120 can be any combination of connections and protocols that will support communications between computer 102 and solution server 122 in accordance with a desired embodiment of the invention.

Solution server 122 is also included in intelligent collating environment 100. Solution server 122 includes RAM 124, a central processing unit 126, and persistent storage 128. Persistent storage 128 may, for example, be a hard disk drive. Alternatively, or in addition to a magnetic hard disk drive, persistent storage 128 can include a solid state hard drive, a semiconductor storage device, read-only memory (ROM), erasable programmable read-only memory (EPROM), flash memory, or any other computer-readable storage medium that is capable of storing program instructions or digital information. Solution server 122 may be a laptop computer, tablet computer, netbook computer, personal computer (PC), a desktop computer, a personal digital assistant (PDA), a smart phone, or any programmable electronic device capable of communicating with computer 102 via network 120 and with various components and devices within intelligent collating environment 100. Persistent storage 128 includes application "A" 130, application "B" 132, and application "C" 134. Server applications 130, 132, and 134 are any computer application, such as a web server, that can send and receive data over a network, e.g., network 120, or any other viable data network. There can be many more solution server computers in this environment than are depicted in FIG. 1.

Figure 2:
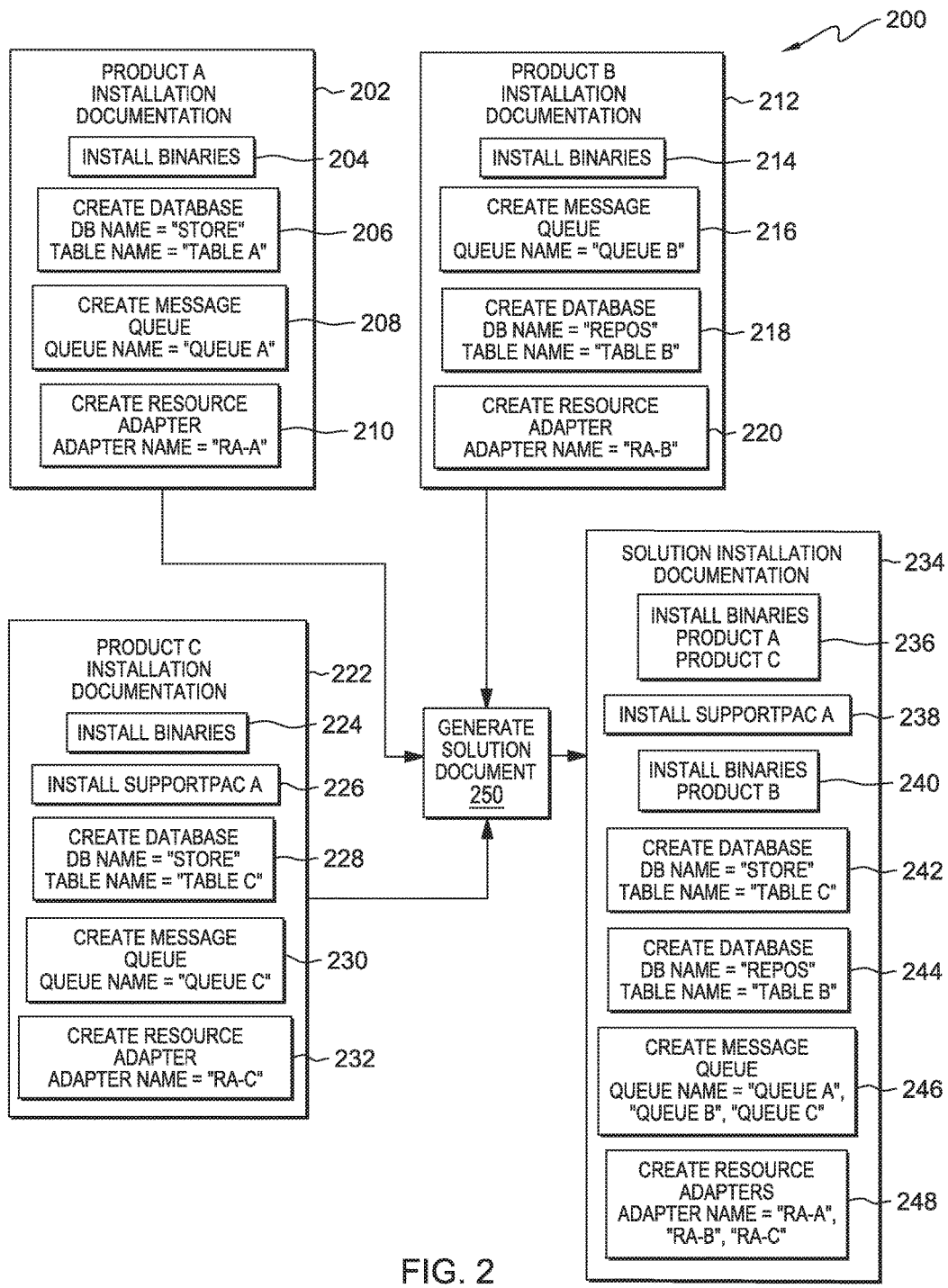
FIG. 2 illustrates operational steps of generating a solution installation document, from three product installation documents, within the data processing environment of FIG. 1, in an embodiment in accordance with the present invention.

FIG. 2, generally designated 200, illustrates operational steps of generating a solution installation document, from three product installation documents, within the data processing environment of FIG. 1, in an embodiment in accordance with the present invention. A user of computer 102 scans product "A" installation documentation 202, product "B" installation documentation 212, and product "C" installation documentation 222 into intelligent collator 112 to create solution installation documentation 234. Each installation document contains tasks and procedure steps required to install the product onto a computer system. Product "A" installation documentation 202 contains steps to install binaries 204, create a database named "Store" with a table named "Table A" 206, create message queue named "Queue A" 208, and create resource adapter named "RA-A" 210. In another embodiment, product installation documents may be transmitted to computer 102 from another computer or device over a data connection on network 120. In other embodiments, product installation documents may be transferred to computer 102 via a magnetic hard disk drive, a solid state hard drive, a semiconductor storage device, read-only memory (ROM), erasable programmable read-only memory (EPROM), flash memory, or any other computer-readable storage medium that is capable of storing digital information.

Some installation documents may vary slightly from others. For example, product "B" installation documentation 212 contains steps to install binaries 214, create a message queue named "Queue B" 216, create a database named "Repos" with a table named "Table B" 218, and create resource adapter named "RA-B" 220. Product "C" installation documentation 222 contains steps to install binaries 224, install Support Pac "A" 226, create a database named "Store" with a table named "Table C" 228, create message queue named "Queue C" 230, and create resource adapter named "RA-C" 232.

Product "A" installation documentation 202 and product "C" installation documentation 222 both contain overlapping procedures that require a database table named "store" to be created as depicted in steps 206 and 228. Product "A" installation documentation 202 requires a table named "Table A" to be created in this database, and product "C" installation documentation 222 requires a table named "Table C". In addition to the overlapping procedures, there are also prerequisite conditions that must be met as well. Product "C" installation documentation 222 requires Support Pac "A" 226 to be installed. However Support Pac "A" 226 must be installed before product "B" installation documentation 212.

Intelligent collator 112 analyzes each set of product installation instructions and generates a set of prescriptive step-by-step installation instructions to install the solution as depicted in 250. In one example embodiment, the original authors of product "A" installation documentation 202, product "B" installation documentation 212, and product "C" installation documentation 222 may include annotations in the product documentation through tags and name/value pairs that describes each procedure in the documentation, and the parameters and prerequisites of each procedure. These annotations may be shipped with the documentation. An Extensible Markup Language (XML) data model such as Darwin Information Typing Architecture (DITA) is used to store the annotations. Darwin Information Typing Architecture is an XML data model for authoring. Extensible Markup Language is a markup language that defines a set of rules for encoding documents in a format which is both human-readable and machine-readable. Generated solution installation documentation 234 contains steps to install binaries from product "A" and product "C" 236, install Support Pac "A" 238, install binaries from product "B" 240, create a database named "Store" with a table named "Table C" 242, create a database named "Repos" with a table named "Table B" 244, create message queues named "Queue A", "Queue B", and "Queue C" 246, and create resource adapters named "RA-A", "RA-B", and "RA-C" 248.

Generated solution installation documentation 234 accommodates common tasks, such as creating multiple tables in the same database. Intelligent collator 112 then groups these tasks together. For example, databases, messages queues, and resource adapters required for each product installation are grouped into a common set of instructions. Prerequisite tasks that require one task to be completed before another are performed in the required order, for example, Support Pac "A" 238 is installed before installing binaries for product "B" 240. Details of the solution installation documentation generation are described in greater detail with regard to FIG. 5.

Figure 3:
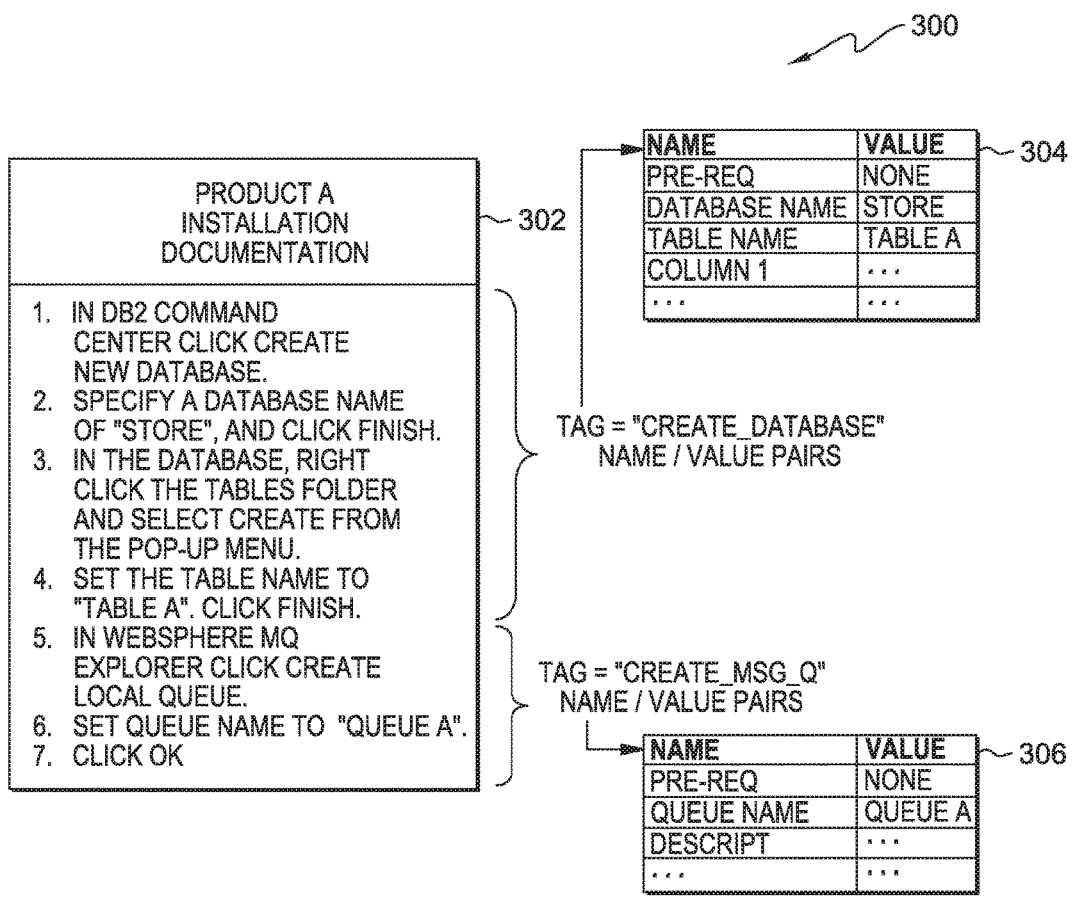
FIG. 3 illustrates operational steps of an intelligent collator program, generating an installation documentation for a solution through the processing of embedded tags within the data processing environment of FIG. 1, in an embodiment in accordance with the present invention.

FIG. 3, generally designated 300, illustrates operational steps of an intelligent collator program, generating installation documentation for a solution through the processing of embedded tags within the data processing environment of FIG. 1, in an embodiment in accordance with the present invention. Intelligent collator 112 generates installation documentation for a solution through the processing of tags. Product "A" installation documentation 302 is embedded with tags that group together procedures of installation instructions. The tags define a name for each procedure (i.e., "create_database" and "create_messageq") and a set of name/value pairs stating the variables of how the procedure is executed (e.g., the name of a database table or message queue to create) as depicted in 304 and 306. Prerequisites (i.e., prior steps that must first be completed) are also defined.

Figure 4:
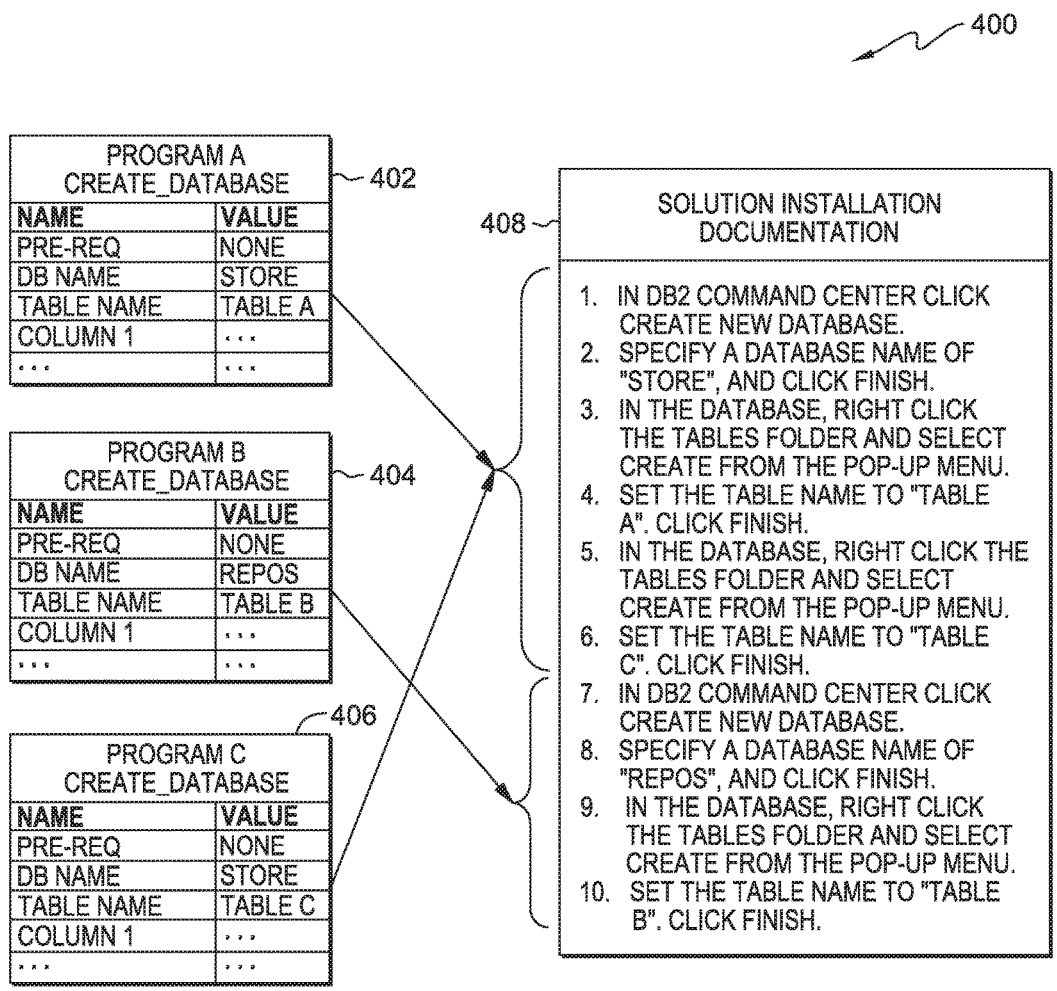
FIG. 4 illustrates operational steps of an intelligent collator program, generating prescriptive step-by-step instructions by combining related tags and sequencing instructions to ensure prerequisite instructions are performed first within the data processing environment of FIG. 1, in an embodiment in accordance with the present invention.

FIG. 4, generally designated 400, illustrates operational steps of an intelligent collator program, generating prescriptive step-by-step instructions by extracting and combining related tags and sequencing instructions to ensure prerequisite instructions are performed first within the data processing environment of FIG. 1, in an embodiment in accordance with the present invention. Intelligent collator 112 embeds the product installation documentation with tags to group together procedures of installation instructions as described in the discussion of FIG. 3 above. Intelligent collator 112 generates prescriptive step-by-step instructions for solution installation documentation 408 by combining related tags 402, 404, and 406, and sequencing the instructions so that prerequisite tasks are performed first. For example, the "create_database" procedure for programs "A" 402 and program "C" 406 create a table (e.g., "Table A" and "Table C") in the same database named "Store". The installation instructions for program "A" 402 and program "C" 406 both contain steps to create this database, but it would be invalid to create the same database twice. The system compares the name/value pairs for "create_database" and generates a set of instructions that creates the database only once, and then provides additional instructions to create each table in the database. The "create_database" procedure for program "B" 404 is then performed once the prerequisite tasks are completed.

Figure 5:
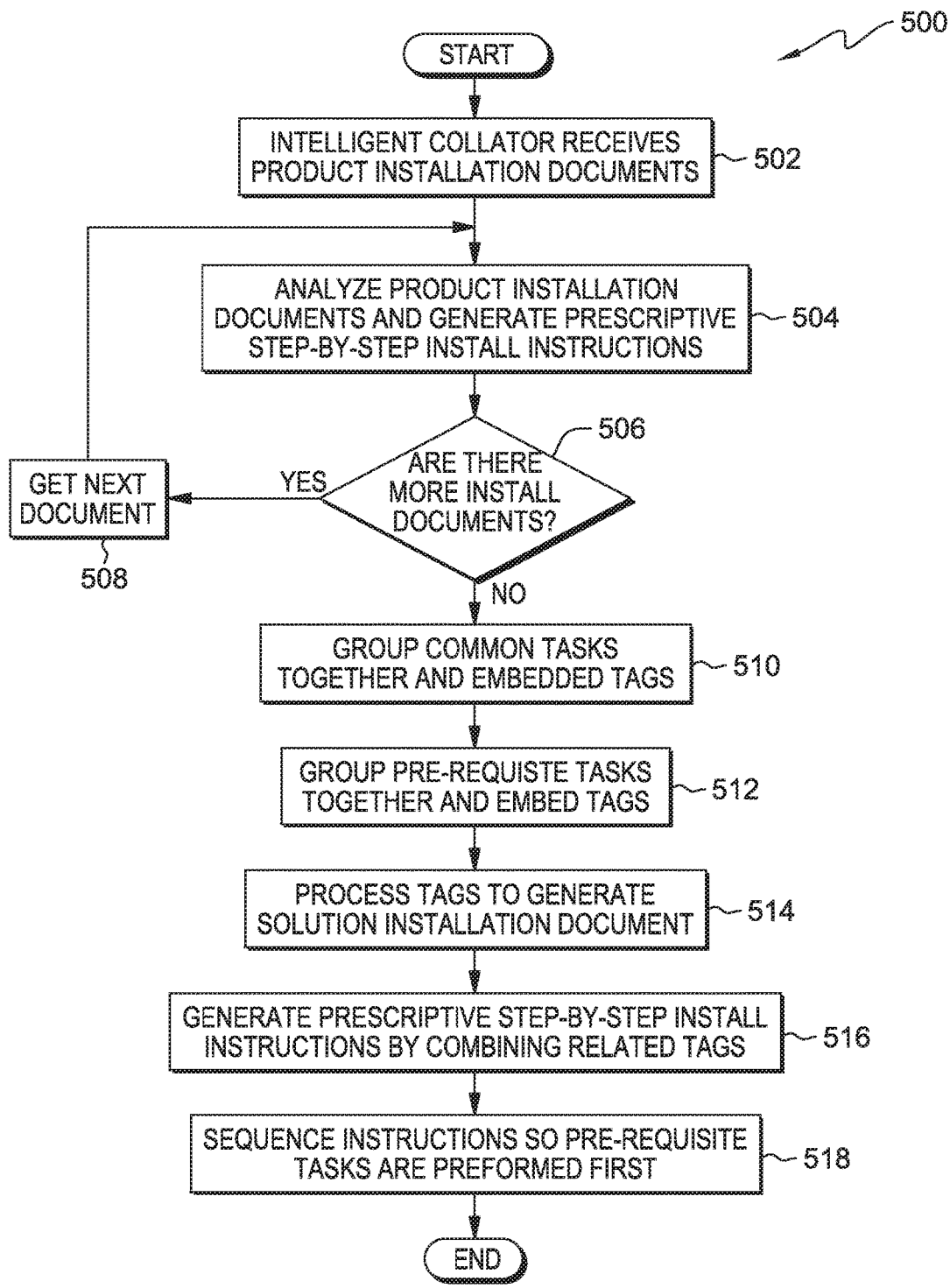
FIG. 5 is a flow chart depicting the operational steps of the intelligent collator generating a step-by-step solution for multiple products, in an embodiment in accordance with the present invention.

FIG. 5 is a flow chart, generally designated 500, depicting the operational steps of the intelligent collator generating a step-by-step solution for multiple products, in an embodiment in accordance with the present invention. A user of computer 102 scans product installation document "A" 114, product installation document "B" 116, and product installation document "C" 118 into intelligent collator 112 as depicted in step 502. In other embodiments, product installation documents may be inputted into intelligent collator 112 via a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or a floppy disk.

Intelligent collator 112 analyzes the product installation documents and generates prescriptive step-by-step installation instructions as depicted in step 504. In an example embodiment, a user who is not the original documentation author annotates product "A" installation documentation 202, product "B" installation documentation 212, and product "C" installation documentation 222 with tags and name/value pairs on a local copy of the documentation. These annotations may be added in any structured data model such as XML. In another example embodiment, annotations of tags and name/value pairs are created automatically through Natural Language Processing (NLP). NLP examines the text, looking for procedure names. When procedures are identified NLP identifies parameters and prerequisites defined for each procedure. These annotations can be added in any structured data model such as XML. The analysis in step 504 uses a simple set of rules to generate the solution documentation.

Intelligent collator 112 uses a set of rules to analyze each procedure in product "A" installation documentation 202, product "B" installation documentation 212, and product "C" installation documentation 222. In one example embodiment, intelligent collator 112 may determine if the current procedure has any prerequisite procedures or is the current procedure a prerequisite for any other procedures. In another example embodiment, intelligent collator 112 may check to see if the current procedure can be combined with other related procedures.

The generated prescriptive step-by-step install instructions group common tasks, such as creating multiple tables in the same database. An example of this would be grouping databases, messages queues, and resource adapters required for each product installation into a common set of instructions. Prerequisite tasks that require one task to be performed before another are performed in the required order. An example of this would be placing the instructions to install Support Pac "A" 226 before the instructions to install product "B" 212.

Once the prescriptive step-by-step install instructions are generated for the given product installation document, intelligent collator 112 checks to see if there are more installation documents to analyze and generate prescriptive step-by-step install instructions for as depicted in decision 506. If there are more installation documents, ("yes" branch, decision 506), intelligent collator 112 retrieves the next document as depicted in step 508 and step 504 is repeated. If there are no more installation documents, ("no" branch, decision 506), intelligent collator 112 groups the common tasks together and embeds tags in the generated installation document as depicted in step 510 and illustrated in FIG. 3. The tags group together related procedures in the installation instructions. Intelligent collator 112 then defines a name for each procedure (e.g., "create_database", "create_messageq") and a set of name/value pairs stating the variables of how the procedure is executed (e.g., the name of a database table or message queue to create). In step 512, intelligent collator 112 groups prerequisite tasks together and embeds them with tags as well. Prerequisite tasks are prior steps that must be completed first before others, such as installing Support Pac "A" 226 before installing product "B" 212.

Intelligent collator 112 then generates a combined solution installation document by combining the generated step-by-step installation instructions generated in step 504 as depicted in step 514. Intelligent collator then combines related tags as illustrated in FIG. 4 and depicted in step 516. For example, the "create_database" procedure for programs "A" 402 and program "C" 406 create a table (e.g., "Table A" and "Table C") in the same database named "Store". The installation instructions for programs "A" 402 and program "C" 406 both contain steps to create this database, but it would be invalid to create the same database twice. The system compares the name/value pairs for "create_database" and generates a set of instructions that creates the database only once, and then provides additional instructions to create each table in the database. The "create_database" procedure for program "B" 404 is then performed once the prerequisite tasks are completed. In step 518, intelligent collator 112 sequences the instructions to ensure prerequisite tasks are performed first as seen in solution installation documentation 234 of FIG. 2.

Figure 6:
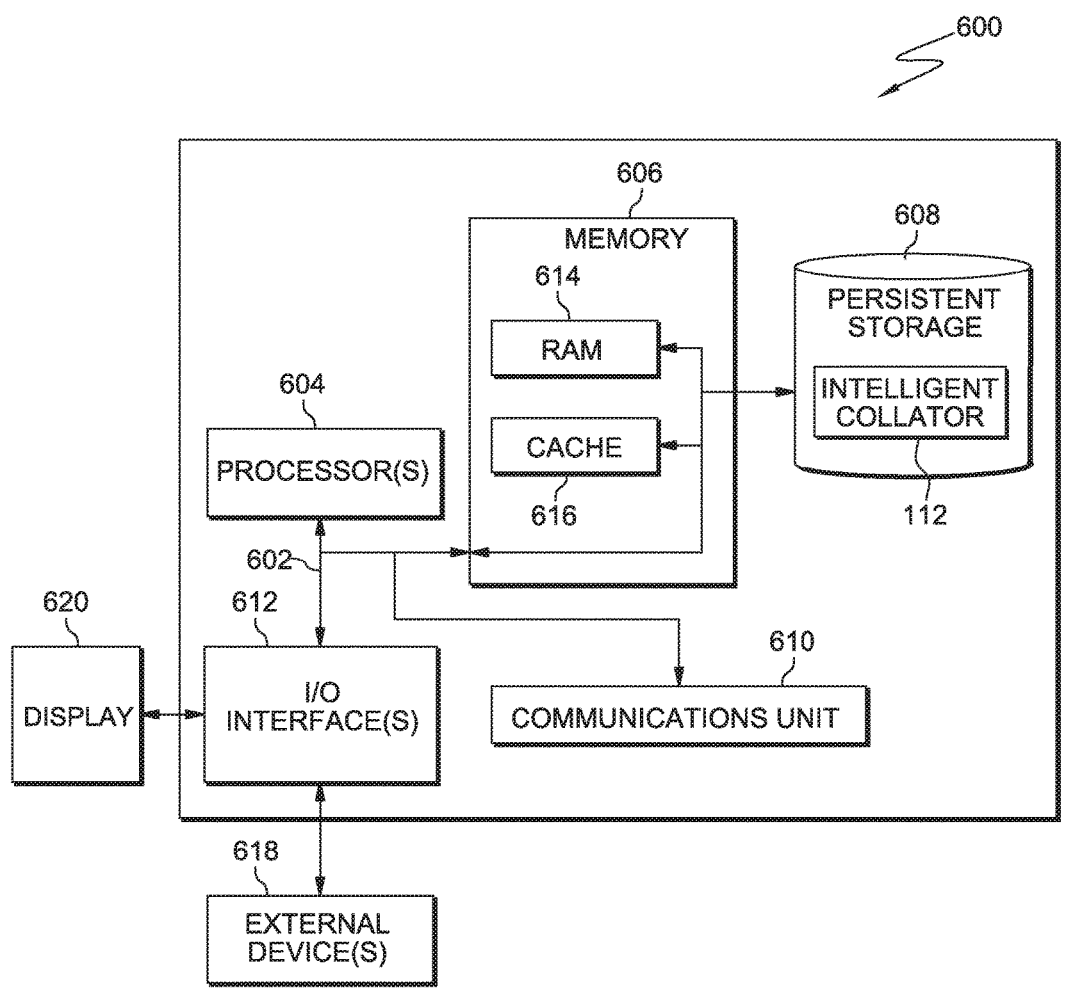
FIG. 6 depicts a block diagram of components of the computer executing the intelligent collator program, in an embodiment in accordance with the present invention.

FIG. 6 depicts a block diagram, generally designated 600, of components of the computer executing the intelligent collator program, in an embodiment in accordance with the present invention. It should be appreciated that FIG. 6 provides only an illustration of one implementation and does not imply any limitations with regard to the environments in which different embodiments may be implemented. Many modifications to the depicted environment may be made.

Computer 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Intelligent collator 112, install document "A" 114, install document "B" 116, and install document "C" 118 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 120 and solution server 122. In these examples, communications unit 610 includes one or more network interface cards. Communications unit 610 may provide communications through the use of either or both physical and wireless communications links. Intelligent collator 112, install document "A" 114, install document "B" 116, and install document "C" 118 may be downloaded to persistent storage 608 through communications unit 610.

I/O interface(s) 612 allows for input and output of data with other devices that may be connected to computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., intelligent collator 112, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for collating and intelligent sequencing of installation documentation, the method comprising:
   automatically creating, by one or more processors, annotations that include one or more tags and name/value pairs, through natural language processing (NLP), wherein the NLP examines a plurality of product installation documents, searching for procedure names, wherein the procedure names correspond to a plurality of software products that are installed and integrated together, and wherein one or more dependencies between the plurality of software products affect an order and steps involved in the installation;
   identifying, by one or more processors, parameters and prerequisites associated with the procedure names to generate complete annotations;
   inserting, by one or more processors, the complete annotations into the plurality of product installation documents using a structured data model;
   parsing, by one or more processors, the plurality of product installation documents to identify annotations within the plurality of product installation documents associated with installation procedures of the plurality of software products;
   extracting, by one or more processors, installation procedure descriptions, parameters, and prerequisites associated with the identified annotations; and
   generating, by one or more processors, prescriptive step-by-step installation instructions according to the installation procedure prerequisites, wherein related tags are combined.

2. The method of claim 1, wherein extracting, by one or more processors, installation procedure descriptions, parameters, and prerequisites associated with the identified annotations further comprises:
   analyzing, by one or more processors, the identified annotations in the plurality of product installation documents to extract one or more tags and name/value pairs that describe each procedure in the plurality of product installation documents of the plurality of software products, and the parameters and prerequisites of each procedure.

3. The method of claim 2, wherein analyzing, by one or more processors, the identified annotations in the plurality of product installation documents of the plurality of software products further comprises:
   determining, by one or more processors, a set of related tasks in the plurality of product installation documents of the plurality of software products;
   arranging, by one or more processors, the set of related tasks into a set of grouped tasks; and
   tagging, by one or more processors, the set of grouped tasks, wherein the tags define the name/value pairs associated with the identified annotations.

4. The method of claim 1, wherein generating, by one or more processors, prescriptive step-by-step installation instructions that integrate installation procedures contained within the plurality of installation documents of the plurality of software products further comprises:

grouping, by one or more processors, the installation procedures contained within the plurality of installation documents into a set of grouped tasks.

5. The method of claim 4, wherein grouping, by one or more processors, the installation procedures contained within the plurality of installation documents into a set of grouped tasks further comprises:

determining, by one or more processors, a set of prerequisite tasks within the plurality of installation documents of the plurality of software products; and arranging, by one or more processors, the set of prerequisite tasks into the set of grouped tasks, such that the set of prerequisite tasks is sequenced in proper order of installation.

6. A computer program product for collating and intelligent sequencing of installation documentation, the computer program product comprising:

one or more computer readable storage media and program instructions stored on the one or more computer readable storage media, the program instructions comprising:

program instructions to automatically create annotations that include one or more tags and name/value pairs, through natural language processing (NLP), wherein the NLP examines a plurality of product installation documents, searching for procedure names, wherein the procedure names correspond to a plurality of software products that are installed and integrated together, and wherein one or more dependencies between the plurality of software products affect an order and steps involved in the installation;

program instructions to identify parameters and prerequisites associated with the procedure names to generate complete annotations;

program instructions to insert the complete annotations into the plurality of product installation documents using a structured data model;

program instructions to parse the plurality of product installation documents to identify annotations within the plurality of product installation documents associated with installation procedures of the plurality of software products;

program instructions to extract installation procedure descriptions, parameters, and prerequisites associated with the identified annotations; and program instructions to generate prescriptive step-by-step installation instructions according to the installation procedure prerequisites, wherein related tags are combined.

7. The computer program product of claim 6, wherein program instructions to extract installation procedure descriptions, parameters, and prerequisites associated with the identified annotations further comprise:

program instructions to analyze the identified annotations in the plurality of product installation documents to extract one or more tags and name/value pairs that describe each procedure in the plurality of product installation documents of the plurality of software products, and the parameters and prerequisites of each procedure.

8. The computer program product of claim 7, wherein program instructions to analyze the identified annotations in the plurality of product installation documents of the plurality of software products further comprise:

program instructions to determine a set of related tasks in the plurality of product installation documents of the plurality of software products;

program instructions to arrange the set of related tasks into a set of grouped tasks; and program instructions to tag the set of grouped tasks, wherein the tags define the name/value pairs associated with the identified annotations.

9. The computer program product of claim 6, wherein program instructions to generate prescriptive step-by-step installation instructions that integrate installation procedures contained within the plurality of installation documents of the plurality of software products further comprise:

program instructions to group the installation procedures contained within the plurality of installation documents into a set of grouped tasks.

10. The computer program product of claim 9, wherein program instructions to group the installation procedures contained within the plurality of installation documents into a set of grouped tasks further comprises:

determining, by one or more processors, a set of prerequisite tasks within the plurality of installation documents of the plurality of software products; and program instructions to arrange the set of prerequisite tasks into the set of grouped tasks, such that the set of prerequisite tasks is sequenced in proper order of installation.

11. A computer system for collating and intelligent sequencing of installation documentation, the computer system comprising:

one or more computer processors;

one or more computer readable storage media;

program instructions stored on the computer readable storage media for execution by at least one of the one or more processors, the program instructions comprising:

program instructions to automatically create annotations that include one or more tags and name/value pairs, through natural language processing (NLP), wherein the NLP examines a plurality of product installation documents, searching for procedure names, wherein the procedure names correspond to a plurality of software products that are installed and integrated together, and wherein one or more dependencies between the plurality of software products affect an order and steps involved in the installation;

program instructions to identify parameters and prerequisites associated with the procedure names to generate complete annotations;

program instructions to insert the complete annotations into the plurality of product installation documents using a structured data model;

program instructions to parse the plurality of product installation documents to identify annotations within the plurality of product installation documents associated with installation procedures of the plurality of software products;

program instructions to extract installation procedure descriptions, parameters, and prerequisites associated with the identified annotations; and program instructions to generate prescriptive step-by-step installation instructions according to the installation procedure prerequisites, wherein related tags are combined.

12. The computer system of claim 11, wherein program instructions to extract installation procedure descriptions, parameters, and prerequisites associated with the identified annotations further comprise:
   program instructions to analyze the identified annotations in the plurality of product installation documents to extract one or more tags and name/value pairs that describe each procedure in the plurality of product installation documents of the plurality of software products, and the parameters and prerequisites of each procedure.

13. The computer system of claim 12, wherein program instructions to analyze the identified annotations in the plurality of product installation documents of the plurality of software products further comprise:
   program instructions to determine a set of related tasks in the plurality of product installation documents of the plurality of software products;
   program instructions to arrange the set of related tasks into a set of grouped tasks; and
   program instructions to tag the set of grouped tasks, wherein the tags define the name/value pairs associated with the identified annotations.

14. The computer system of claim 11, wherein program instructions to generate prescriptive step-by-step installation instructions that integrate installation procedures contained within the plurality of installation documents of the plurality of software products further comprise:
   program instructions to group the installation procedures contained within the plurality of installation documents into a set of grouped tasks.

* * * * *